(12) United States Patent
Kim et al.

(10) Patent No.: US 10,550,745 B2
(45) Date of Patent: Feb. 4, 2020

(54) COOLING DEVICE FOR REDUCTANT SPRAY MODULE, AND SELECTIVE ENGINE COOLING SYTEM HAVING SAME

(71) Applicant: DOOSAN INFRACORE CO., LTD., Incheon (KR)

(72) Inventors: Jae-seong Kim, Incheon (KR); Ku-yeon Han, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 2 days.

(21) Appl. No.: 15/774,214

(22) PCT Filed: Nov. 7, 2016

(86) PCT No.: PCT/KR2016/012757
§ 371 (c)(1),
(2) Date: May 7, 2018

(87) PCT Pub. No.: WO2017/078505
PCT Pub. Date: May 11, 2017

(65) Prior Publication Data
US 2018/0328247 A1   Nov. 15, 2018

(30) Foreign Application Priority Data
Nov. 5, 2015   (KR) .................. 10-2015-0154896

(51) Int. Cl.
*F01N 3/20* (2006.01)
*F01N 3/08* (2006.01)
(Continued)

(52) U.S. Cl.
CPC ........... *F01N 3/208* (2013.01); *F01N 3/0842* (2013.01); *F01N 3/2066* (2013.01); *F01N 13/10* (2013.01);
(Continued)

(58) Field of Classification Search
CPC ...... F01N 3/0842; F01N 3/2066; F01N 3/208; F01N 13/10; F01N 2240/02;
(Continued)

(56) References Cited

U.S. PATENT DOCUMENTS 9,328,643 B2   5/2016   Onodera et al.
2013/0071291 A1   3/2013   Onodera et al.
(Continued)

FOREIGN PATENT DOCUMENTS

EP   1691046 A1   8/2006
EP   2899380 A1   7/2015
(Continued)

OTHER PUBLICATIONS

International Search Report for PCT/KR2016/012757 dated Feb. 13, 2017.
(Continued)

*Primary Examiner* — Audrey K Bradley
(74) *Attorney, Agent, or Firm* — Hauptman Ham, LLP (57) ABSTRACT

A cooling device for a reducing agent injection module, includes a reducing agent injection module installed in an exhaust pipe to inject a reducing agent into the exhaust pipe and having a module cooling channel therein through which a coolant flows to cool the reducing agent injection module, a coolant pump configured to supply the coolant to the module cooling channel, a coolant circulation line including a coolant supply line and a coolant recovery line to connect the coolant pump and the module cooling channel, and a coolant recovery portion installed in the coolant recovery line to store the coolant flowing through the reducing agent injection module and positioned higher than the reducing agent injection module along a gravitational direction.

8 Claims, 6 Drawing Sheets

(51) Int. Cl.
   *F01N 13/10* (2010.01)
   *F01P 3/12* (2006.01)
   *F01P 11/02* (2006.01)

(52) U.S. Cl.
   CPC ......... *F01P 11/029* (2013.01); *F01N 2240/02* (2013.01); *F01N 2260/024* (2013.01); *F01N 2610/02* (2013.01); *F01N 2610/11* (2013.01); *F01N 2610/1406* (2013.01); *F01N 2610/1453* (2013.01); *F01P 3/12* (2013.01); *F01P 2060/16* (2013.01); *Y02T 10/24* (2013.01)

(58) Field of Classification Search
   CPC ........... F01N 2260/024; F01N 2610/02; F01N 2610/11; F01N 2610/1406; F01N 2610/1453; F01P 3/12; F01P 11/029; F01P 2060/16; Y02T 10/24
   See application file for complete search history.

(56) References Cited

U.S. PATENT DOCUMENTS

| | | |
|---|---|---|
| 2014/0322088 A1 | 10/2014 | Niaz |
| 2014/0369899 A1* | 12/2014 | Fahrenkrug ........... F01N 3/2066 422/173 |
| 2015/0144305 A1* | 5/2015 | Kowada .................... F01P 3/20 165/104.19 |
| 2015/0198075 A1* | 7/2015 | Gong .................... F01N 3/2066 60/274 |
| 2017/0044951 A1* | 2/2017 | Bilancia .................... F01N 9/00 |

FOREIGN PATENT DOCUMENTS

| | | |
|---|---|---|
| JP | 03290017 A * | 12/1991 |
| KR | 96-17934 U | 6/1996 |
| KR | 10-2013-0014235 A | 2/2013 |
| KR | 10-2015-0099892 A | 9/2015 |
| WO | 2014/196346 A1 | 12/2014 |
| WO | 2015/126034 A1 | 8/2015 |

OTHER PUBLICATIONS

Extended European Search Report dated Feb. 15, 2019 in connection to counterpart European Patent Application No. 16862520.0.

* cited by examiner

COOLING DEVICE FOR REDUCTANT SPRAY MODULE, AND SELECTIVE ENGINE COOLING SYTEM HAVING SAME

CROSS REFERENCE TO RELATED APPLICATION

This present application is a national stage filing under 35 U.S.C. § 371 of PCT application number PCT/KR2016/012757 filed on Nov. 7, 2016 which is based upon and claims the benefit of priority to Korean Patent Application No. 10-2015-0154896 filed on Nov. 5, 2015 in the Korean Intellectual Property Office. The disclosures of the above-listed applications are hereby incorporated by reference herein in their entirety.

TECHNICAL FIELD

The present invention relates to a coolant circulation system for a reducing agent injection module and a selective catalytic reduction system including the same, more particularly, to a cooling device of a reducing agent injection module for an exhaust gas after-treatment and an engine cooling system including the same.

BACKGROUND ART

A diesel engine using compression-ignition combustion has advantages such as a high expansion ratio, but has disadvantages such as vibrations, emissions of pollutants including nitrogen oxide (NOx) and dust or the like. Thus, in order to meet increasingly stringent exhaust gas regulation, an exhaust gas after-treatment device including a selective catalytic reduction (SCR) device may be provided.

A reducing agent injection module may be installed in front of the selective catalytic reduction device to inject a reducing agent such as urea toward a flow direction of an exhaust gas. The selective catalytic reduction device may react catalytically the reducing agent with nitrogen oxide (NOx) of the exhaust gas such that the nitrogen oxide is reduced into a nitrogen gas and water. Here, as the reducing agent injection module is exposed to the exhaust gas of high temperature, an engine coolant may circulate through a coolant circulation line connected to the reducing agent injection module to prevent thermal damages on the reducing agent injection module.

However, as an engine stops, a coolant pump may stop to operate so that the flow of the coolant through the coolant circulation line is stopped. In this time, the reducing agent injection module may continue to be heated by the exhaust gas of high temperature, and thus, the reducing agent injection module may be deformed due to the heat or a nozzle of the reducing agent injection module may be blocked by a solid material vaporized from urea.

DISCLOSURE OF THE INVENTION

Problems to be Solved

An object of the present invention provides a cooling device of a reducing agent injection module having low-cost and improved cooling performances.

Another object of the present invention provides an engine cooling system including the above-mentioned cooling device of a reducing agent injection module.

Means to Solve the Problems

According to example embodiments, a cooling device for a reducing agent injection module, includes a reducing agent injection module installed in an exhaust pipe to inject a reducing agent into the exhaust pipe and having a module cooling channel therein through which a coolant flows to cool the reducing agent injection module, a coolant pump configured to supply the coolant to the module cooling channel, a coolant circulation line including a coolant supply line and a coolant recovery line to connect the coolant pump and the module cooling channel, and a coolant recovery portion installed in the coolant recovery line to store the coolant flowing through the reducing agent injection module and positioned higher than the reducing agent injection module along a gravitational direction. The coolant recovery portion includes a vapor discharge outlet which is connected to an upper portion of the coolant recovery portion to discharge the coolant in vapor state in the coolant recovery portion.

In example embodiments, the coolant recovery portion may further include a vapor exhaust cap connected to the vapor discharge outlet, and when a vapor pressure in the vapor discharge outlet is greater than a predetermined pressure, the coolant in vapor state may be exhausted through the vapor exhaust cap to a surrounding environment.

In example embodiments, the cooling device for a reducing agent injection module may further include a vapor discharge line connected to the vapor exhaust outlet and a vapor storage portion connected to the vapor discharge line to store the coolant in vapor state discharged through the vapor exhaust outlet.

In example embodiments, the cooling device for a reducing agent injection module may further include a radiator configured to cool the coolant flowing through the coolant circulation line. The vapor storage portion may be installed over the radiator to store a coolant in vapor state generated in the radiator.

In example embodiments, the vapor storage portion may further include a vapor exhaust cap, and wherein when a vapor pressure within the vapor storage portion is greater than a predetermined pressure, the coolant in vapor state may be exhausted through the vapor exhaust cap to a surrounding environment.

In example embodiments, the coolant recovery line may include a first coolant recovery line connecting the module cooling channel and the coolant recovery portion and a second coolant recovery line connecting the coolant recovery portion and the coolant pump.

According to example embodiments, an engine cooling system includes a selective catalytic reduction device installed in an exhaust pipe through which an exhaust gas from an engine is exhausted and configured to reduce a nitrogen oxide in the exhaust gas, a reducing agent injection module connected to the exhaust pipe to inject a reducing agent into the exhaust pipe upstream of the selective catalytic reduction device and having a module cooling channel therein, a coolant circulation line including a coolant supply line for supplying a coolant to the module cooling channel and a coolant recovery line for recovering the coolant heated in the module cooling channel, and a coolant recovery portion installed higher than the reducing agent injection module along a gravitational direction to store the coolant discharged through the coolant recovery line and including a vapor discharge outlet for discharging the coolant in vapor state.

In example embodiments, the engine cooling system may further include a vapor discharge line connected to the vapor exhaust outlet and a vapor storage portion connected to the vapor discharge line to store the coolant in vapor state discharged through the vapor exhaust outlet.

In example embodiments, the engine cooling system may further include a radiator configured to cool the coolant flowing through the coolant circulation line. The vapor storage portion may be installed over the radiator to store a coolant in vapor state generated in the radiator.

In example embodiments, the vapor storage portion may further include a vapor exhaust cap, and when a vapor pressure within the vapor storage portion is greater than a predetermined pressure, the coolant in vapor state may be exhausted through the vapor exhaust cap to a surrounding environment.

In example embodiments, the engine cooling system may further include a coolant pump configured to forcibly circulate the coolant through the coolant circulation line, and the coolant recovery line may include a first coolant recovery line connecting the module cooling channel and the coolant recovery portion and a second coolant recovery line connecting the coolant recovery portion and the coolant pump.

In example embodiments, the coolant in liquid state and the coolant in vapor state in the module cooling channel may move to the coolant recovery portion through the first coolant recovery line, and the coolant in liquid state in the coolant recovery portion may move to the coolant pump through the second coolant recovery line.

In example embodiments, the engine cooling system may further include an engine coolant circulation line to circulate the coolant for cooling an engine and including an engine coolant supply line and an engine coolant recovery line, a coolant pump installed in the engine coolant circulation line to forcibly circulate the coolant, a radiator configured to cool the coolant flowing through the engine coolant recovery line and to supply the coolant to the engine coolant supply line, and a vapor storage portion positioned over the radiator along the gravitational direction to store the coolant in vapor state discharged from the radiator. The coolant supply line and the coolant recovery line may be connected to the engine coolant circulation line such that at least a portion of the coolant circulating through the engine coolant circulation line is supplied to the module cooling channel, and the vapor storage portion may be connected to the vapor discharge outlet through a vapor discharge line to store the coolant in vapor state discharged from the engine coolant circulation line and the module cooling channel respectively.

In example embodiments, the vapor storage portion may further include a vapor exhaust cap, and when a vapor pressure within the vapor storage portion is greater than a predetermined pressure, the coolant in vapor state may be exhausted through the vapor exhaust cap to a surrounding environment.

In example embodiments, the coolant supply line may branch off from the engine coolant recovery line and the coolant recovery line may branch off from the engine coolant supply line, and wherein a branch point of the engine coolant supply line and the coolant recovery line may be positioned upstream of the coolant pump along the engine coolant supply line.

In example embodiments, the engine cooling system may further include an engine coolant circulation line to circulate the coolant for cooling an engine and including an engine coolant supply line and an engine coolant recovery line, a coolant pump installed in the engine coolant circulation line to forcibly circulate the coolant, and a radiator configured to cool the coolant flowing through the engine coolant recovery line and to supply the coolant to the engine coolant supply line. The coolant recovery portion may be positioned over the radiator along the gravitational direction and the coolant recovery portion may be connected with the radiator to store the coolant in vapor state discharged from the radiator and the coolant discharged from the module cooling channel. The coolant supply line and the coolant recovery line may be connected to the engine coolant circulation line such that at least a portion of the coolant circulating through the engine coolant circulation line is supplied to the module cooling channel. The coolant supply line may be connected to the engine coolant circulation line and the coolant recovery line may be connected to the engine coolant circulation line via the coolant recovery portion such that at least a portion of the coolant circulating through the engine circulation line is supplied to the module cooling channel.

In example embodiments, the coolant recovery portion may further include a vapor exhaust cap connected to the vapor discharge outlet, and when a vapor pressure in the vapor discharge outlet is greater than a predetermined pressure, the coolant in vapor state may be exhausted through the vapor exhaust cap to a surrounding environment.

Effects of the Invention

According to example embodiments, when a coolant pump operates, a coolant may circulate through a coolant circulation line to cool a reducing agent injection module. When the coolant pump stops, a coolant in vapor state may be exhausted and a new coolant in liquid may be replenished, to cool the reducing agent injection module. In here, the coolant in vapor state may be removed through a vapor discharge outlet provided in a coolant recovery portion, to thereby prevent thermal damages on the reducing agent injection module.

However, the effect of the invention may not be limited thereto, and may be expanded without being deviated from the concept and the scope of the present invention.

BEST MODE FOR CARRYING OUT THE INVENTION

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to"

another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferable embodiments of the present invention will be explained in detail with reference to the accompanying drawings. Like numerals refer to like elements throughout example embodiments, and any further repetitive explanation concerning the similar elements will be omitted.

Figure 1:
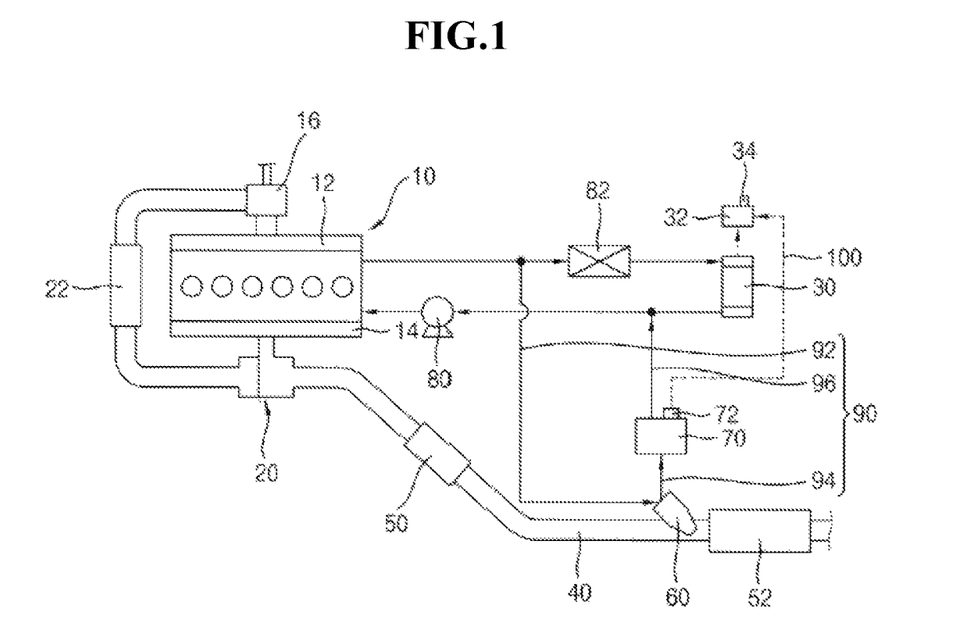
FIG. 1 is a view illustrating a selective catalytic reduction system in accordance with example embodiments.
Figure 2:
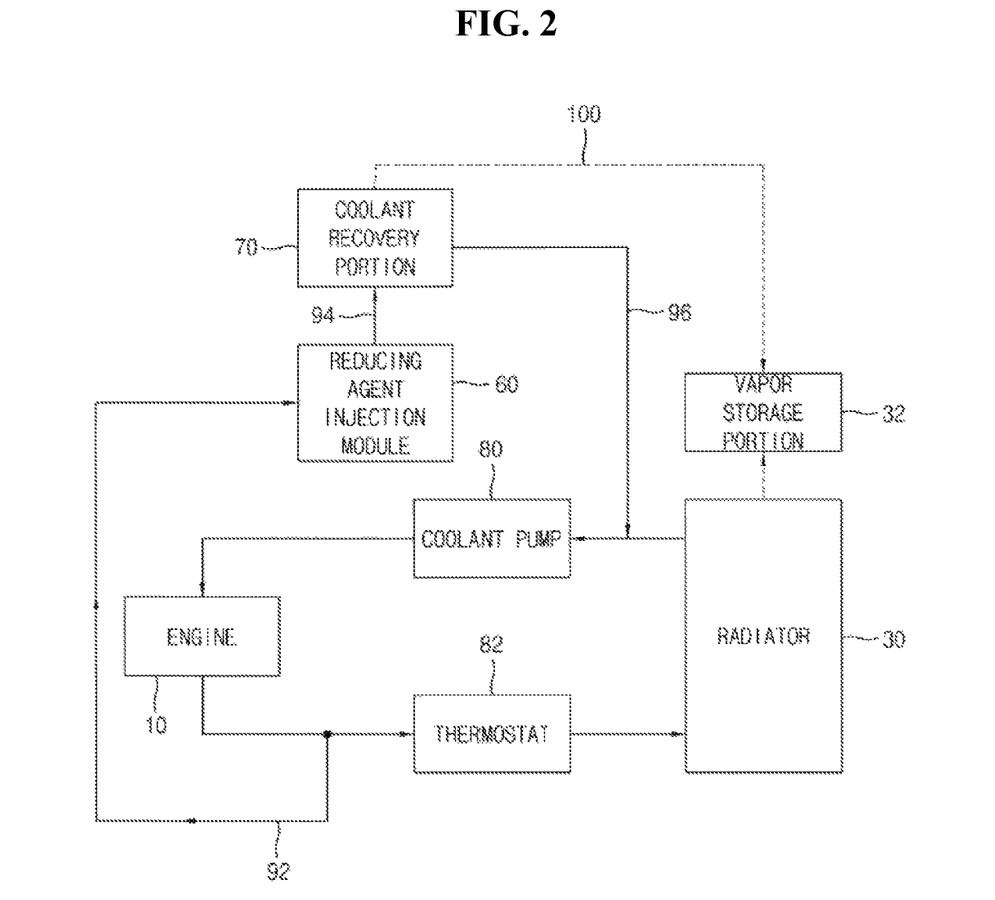
FIG. 2 is a block diagram illustrating the selective catalytic reduction system of FIG. 1.
Figure 3:
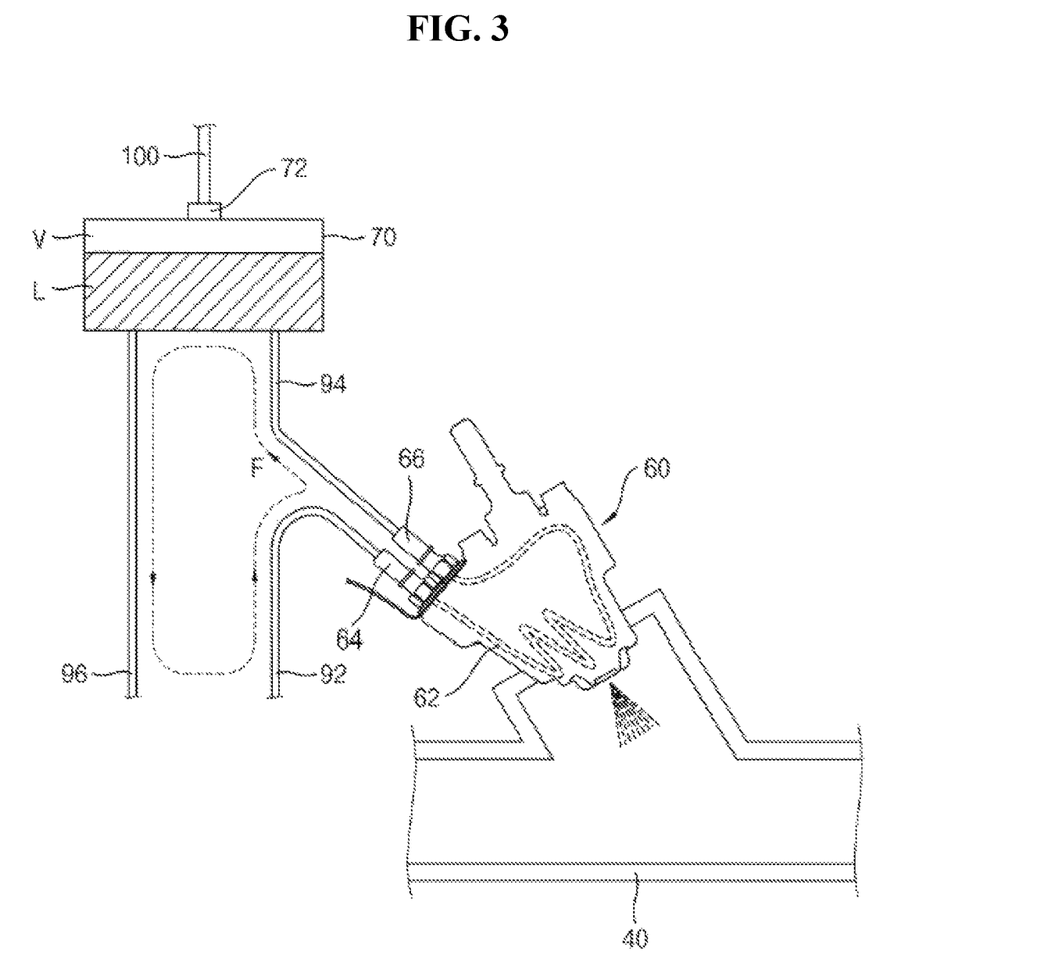
FIG. 3 is a cross-sectional view illustrating a cooling device of a reducing agent injection module in FIG. 1.
Figure 4:
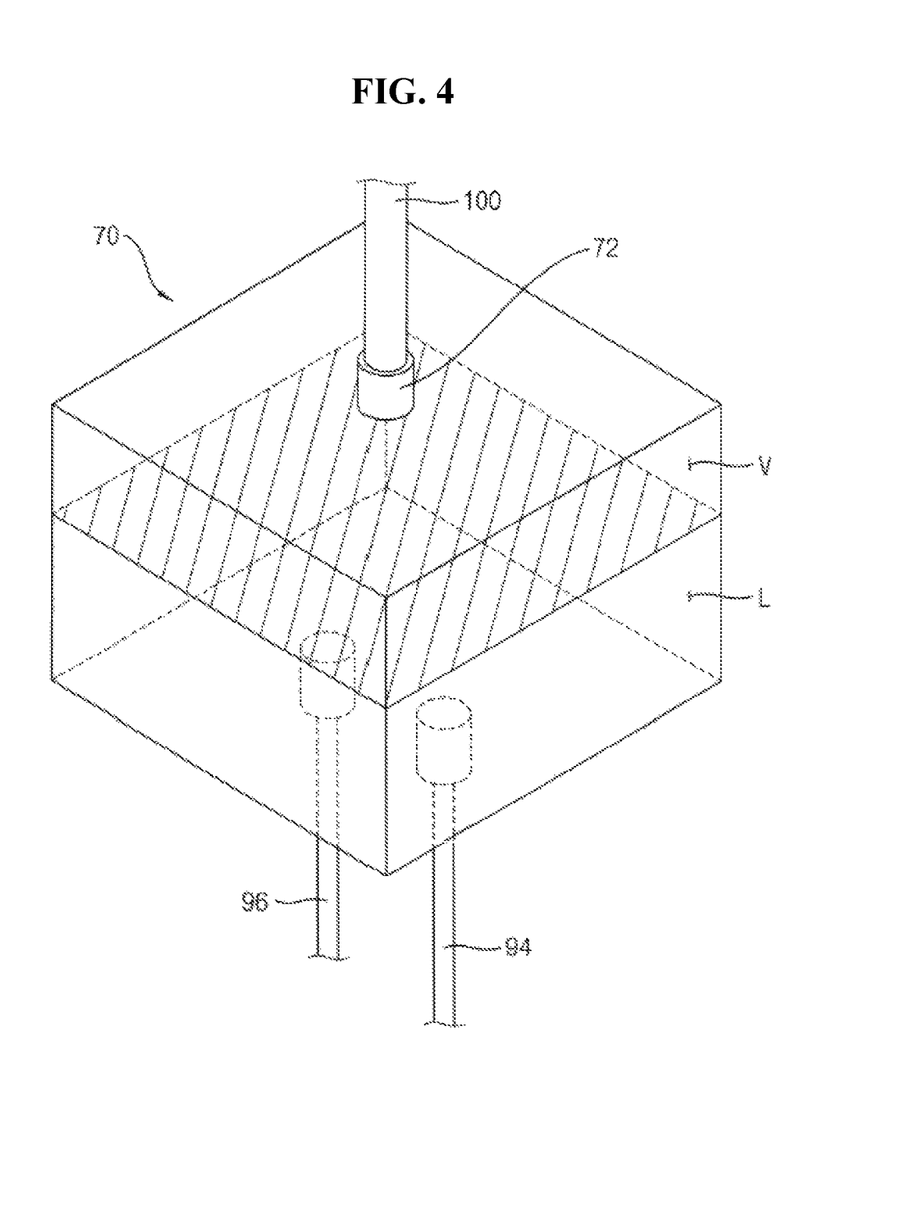
FIG. 4 is a perspective view illustrating a coolant recovery portion in FIG. 1.

FIG. 1 is a view illustrating a selective catalytic reduction system in accordance with example embodiments. FIG. 2 is a block diagram illustrating the selective catalytic reduction system of FIG. 1. FIG. 3 is a cross-sectional view illustrating a cooling device of a reducing agent injection module in FIG. 1. FIG. 4 is a perspective view illustrating a coolant recovery portion in FIG. 1. In FIGS. 1 and 2, a solid line represents a flow of a coolant and a broken line represents a flow of a coolant in a vapor state.

Referring to FIGS. 1 to 4, a selective catalytic reduction system may include a reducing agent injection module 60 configured to inject a reducing agent into an exhaust pipe 40 in order to reduce NOx emissions in an exhaust gas from an engine 10, a selective catalyst reduction (SCR) device 52 configured to catalytically react the reducing agent with the nitrogen oxide in the exhaust gas, and a cooling device for cooling the reducing agent injection module 60.

As illustrated in FIG. 1, a fuel gas may be injected into the engine 10 and the engine 10 may operate, and the exhaust gas from the engine 10 may be exhausted through the exhaust pipe 40.

In particular, the fuel gas may be supplied by a fuel supply (not illustrated), may be mixed with an air, which is supplied through a turbocharger 20, in a mixer 16, and then, may be supplied into a combustion chamber of the engine via an intake manifold 12. In here, the air flowing from the turbocharger 20 to the engine 10 may be cooled by an intercooler 22. Additionally, some of the exhaust gas exhausted from the combustion chamber through the exhaust pipe 40 may be recirculated to be mixed in the mixer 16 through an exhaust recirculation line (not illustrated) and then may be supplied to the intake manifold 12.

A coolant discharged from a coolant pump 80 may cool the engine 10. The coolant may be a fluid having excellent heat transfer properties. A thermostat 82 may detect a temperature of the coolant heated by the engine 10, and an electronic control unit (ECU) may control the coolant pump 80 based on the detected temperature information. While the coolant heated by the engine 10 flows through a radiator 30, the coolant may be cooled by the heat transfer with the outside air. On the other hand, the exhaust gas discharged through an exhaust manifold 14 of the engine 10 may flow through the turbocharger 20 and may be exhausted to a surrounding environment via the exhaust pipe 40.

The reducing agent injection module 60 may be installed in front of the selective catalyst reduction device 52 and may spray a reducing agent such as urea into the exhaust pipe 40 to reduce the nitrogen oxide in the exhaust gas exhausted from the engine 10. In here, 'being in front of' means being relatively more near the engine 10 along a flow (F) of the exhaust gas exhausted from the engine 10.

Because the temperature of the exhaust gas from the engine 10 ranges as high as several hundreds of degrees (° C.), the reducing agent may be injected into the exhaust pipe 40 and then be vaporized immediately. The vaporized reducing agent may be mixed with the exhaust gas, and the nitrogen oxide may catalytically react with the reducing agent in the selective catalyst reduction device 52 such that the nitrogen oxide is reduced into a nitrogen gas and water which are harmless to humans.

The selective catalyst reduction device 52 may be installed in rear of the reducing agent injection module 60 within the exhaust pipe 40, and may reduce the nitrogen oxide into harmless nitrogen ($N_2$) by Reaction Equations 1 to 3. In here, 'being in rear of' means being relatively farther away from the engine 10 along the flow (F) of the exhaust gas exhausted from the engine 10.

$$(NH_2)_2CO + H_2O \rightarrow CO_2 + 2NH_3 \quad \text{[Reaction Equation 1]}$$

$$4NO + 4NH_3 + O_2 \rightarrow 4N_2 + 6H_2O \quad \text{[Reaction Equation 2]}$$

$$6NO_2 + 8NH_3 \rightarrow 7N_2 + 12H_2O \quad \text{[Reaction Equation 3]}$$

Urea (($NH_2$)$_2$CO) supplied from the reducing agent injection module 60 may generate ammonia ($NH_3$) by hydrolysis. The generated ammonia may reduce NO and $NO_2$, and convert into harmless nitrogen gas ($N_2$).

In example embodiments, the selective catalyst reduction device 52 may include a carrier (not illustrated) having a plurality of passages. The carrier may have a plurality of the passages extending in an axial direction, to increase a contact area with the exhaust gas.

For example, the carrier may be formed by extrusion of a ceramic raw material to have a honeycomb shape. Examples of the carrier may be cordierite, silicon carbide fecalloy, NiCrAl, NiFeCrAl, etc. Alternatively, the carrier may be formed of metal to have a porous structure. For example, the carrier may be formed to have a metal fiber structure with a matrix of metal fibers, or a metal foam with numerous pores.

In example embodiments, the selective catalytic reduction system may further an ammonia slip catalyst device (not illustrated) which is installed in rear of the selective catalytic reduction device 52 to remove ammonia from the exhaust gas.

The ammonia generated by the reducing agent injected by the reducing agent injection module 60 to reduce nitride oxide in the exhaust gas. In here, more ammonia than a stoichiometric amount may be supplied to maximize the reduction efficiency of nitrogen oxide. Thus, ammonia unreacted during the catalyst reaction, referred to as ammonia slip, may be released into the atmosphere, causing air pollution. The ammonia slip catalyst device may remove the residual ammonia to prevent the ammonia slip.

In example embodiments, the selective catalytic reduction system may further include a mixing device (not illustrated) between the reducing agent injection module 60 and the selective catalytic reduction device 52. The mixing device may mix gently the reducing agent injected from the reducing agent injection module 60 and the exhaust gas to increase reduction efficiency of nitrogen oxide of the selective catalytic reduction device 52. The mixing device may be omitted as needed.

In example embodiments, the selective catalytic reduction system may further a diesel oxidation catalyst (DOC) device 50 provided in front of the selective catalytic reduction device 52 in the exhaust pipe 40. The diesel oxidation catalyst device 50 may purify carbon monoxide, hydrocarbon, soluble organic fraction, etc.

In example embodiments, the cooling device for the reducing agent injection module may include a coolant supply line 92 connected to an inlet portion 64 of the reducing agent injection module 60 to supply the coolant discharged from the coolant pump 80 to a module cooling channel 62 of the reducing agent injection module 60, a first coolant recovery line 94 connected to an outlet portion 66 of the reducing agent injection module 60, a coolant recovery portion 70 connected to the first coolant recovery line 94, a second coolant recovery line 96 connecting the coolant recovery portion 70 and the coolant pump 80, a vapor discharge line 100 to discharge a coolant in vapor state from the coolant recovery portion 70, and a vapor storage portion 32 connected to the vapor discharge line 100 to store the coolant in vapor state and exhaust the coolant in vapor state to a surrounding environment. For example, the coolant supply line, the first coolant recovery line, the second coolant recovery line and the vapor discharge line may include a hose, a pipe, etc.

In the cooling device of the reducing agent injection module, one coolant pump 80 may be used to cool the reducing agent injection module 60, the engine 10, the turbocharger 20, etc.

The coolant supply line 92, the first coolant recovery line 94 and the second coolant recovery line 96 may constitute a coolant circulation line 90. When the coolant pump 80 operates, that is, the engine 10 operates, the cooling device of the reducing agent injection module may circulate the coolant through the coolant circulation line 90 to prevent the temperature of the reducing agent injection module 60 from being increased by the hot exhaust gas.

As illustrated in FIG. 3, the coolant discharged from the coolant pump 80 may circulate along the coolant circulation line 90 in a circulation direction F to cool the reducing agent injection module 60. In particular, the coolant discharged from the coolant pump 80 may be supplied to the inlet portion 64 of the reducing agent injection module 60 through the coolant supply line 92. Then, the coolant may flow through the module cooling channel 62 to cool the reducing agent injection module 60 by heat transfer, and then, may be discharged through the outlet portion 66. The discharged coolant may be stored temporarily in the coolant recovery portion 70 through the first coolant recovery line 94, and then, may be recovered to the coolant pump 80 through the second coolant recovery line 96.

The coolant recovery portion 70 may be installed between the reducing agent injection module 60 and the coolant pump 80. In particular, the coolant recovery portion 70 may be connected to the reducing agent injection module 60 by the first coolant recovery line 94 and may be connected to the coolant pump 80 by the second coolant recovery line 96.

In example embodiments, the coolant recovery portion 70 may be installed higher than the reducing agent injection module 60 along a gravitational direction. Thus, the coolant vaporized in the module cooling channel 62 of the reducing agent injection module 60 may be floated by a difference of a specific gravity and then recovered in the coolant recovery portion 70, even when the engine stops.

The coolant flowing through the module cooling channel 62 of the reducing agent injection module 60 may be heated by heat transfer with the exhaust gas. Because the coolant circulates through the coolant circulation line 90 while the coolant pump 80 operates, the coolant flowing through the module cooling channel 62 may not be heated to an evaporating temperature.

On the contrary, when the coolant pump 80 stops, that is, the engine 10 cuts off, the coolant may not circulate to be stationary within the module cooling channel 62. In this case, heat from the exhaust pipe 40 may be transferred to the reducing agent injection module 60, and thus, the coolant within the module cooling channel 62 may be vaporized to be phase changed into vapor state. Since the coolant recovery portion 70 is positioned higher than the reducing agent injection module 60 along the gravitation direction, the coolant in vapor state within the reducing agent injection module 60 may rise up to move to the coolant recovery portion 70 and the coolant in liquid state having the same volume as the coolant in vapor state may flow into the module cooling channel 62 through the inlet portion 64 due to the specific gravity. That is, after the coolant pump 80 stops, the coolant in liquid state may be replenished due to the rise up of the coolant in vapor state, to cool the reducing agent injection module 60.

As illustrated in FIG. 4, a coolant in liquid state L and a coolant in vapor state V may be received in the coolant recovery portion 70. The coolant in liquid state L may be received in a lower portion of the coolant recovery portion 70, and the coolant in liquid state L may flow in the coolant recovery portion 70 through the first coolant recovery line 94 and may be discharged to the coolant pump 80 through the second coolant recovery line 96. The coolant in vapor state V may be received in an upper portion of the coolant recovery portion 70, and the coolant in vapor state V may move in the coolant recovery portion 70 through the first coolant recovery line 94 and may be discharged to the vapor storage portion 32 through the vapor discharge line 100 connected to a vapor discharge outlet 72. In FIG. 3, the vapor discharge outlet 72 in an top surface of the coolant recovery portion 70 is illustrated, however, it may not be limited thereto, for example, the vapor discharge outlet 72 may be disposed in the upper portion of the coolant recovery portion 70 or may be connected to the upper portion of the coolant recovery portion 70 through a pipe/hose.

The vapor storage portion 32 may be installed over the radiator 30 in the gravitational direction, to store a coolant in vapor state. That is, the vapor storage portion 32 may store a coolant in vapor state generated in the radiator 30 and a coolant in vapor state discharged from the coolant recovery portion 70 through the vapor discharge line 100.

The coolant may be cooled by heat transfer with the outside air while flowing through the radiator 30. However, when the cooling process on the coolant is poor, the coolant may be vaporized to be phase changed into vapor state. The coolant in vapor state having a relatively high temperature may not cool sufficiently the engine 10, thereby causing damages on the engine 10. In this case, the vapor storage portion 32 may remove the coolant in vapor state existing in the coolant circulation line 90, to thereby prevent thermal damages on the engine 10 and the reducing agent injection module 60. For example, the vapor storage portion may include a surge tank.

In example embodiments, the vapor storage portion 32 may further include a vapor exhaust cap 34 for exhausting the coolant in vapor state to the outside. For example, the vapor exhaust cap may be a pressurized valve which is opened when a pressure of the vapor storage portion is greater than a predetermined pressure. When the vapor exhaust cap 34 is opened, the coolant in vapor state may be exhausted from the vapor storage portion 32. The configuration of the vapor exhaust cap 34 may not be limited thereto, and, for example, the vapor exhaust cap may be installed in the vapor discharge outlet 72. In this configuration, the coolant recovery portion 70 may not be connected to the vapor storage portion 32, and only the coolant recovery portion 70 may be used to exhaust the coolant in vapor state.

As mentioned above, when the coolant pump 80 operates, the coolant may circulate through the coolant circulation line 90 to cool the reducing agent injection module 60. When the coolant pump 80 stops, the coolant in vapor state undergoes natural convection toward the coolant recovery portion 70 to cool the reducing agent injection module 60. In here, the coolant in vapor state may be removed through the vapor discharge outlet 72 in the coolant recovery portion 70, and thus, the thermal damages due to the coolant in vapor state may be prevented.

Figure 5:
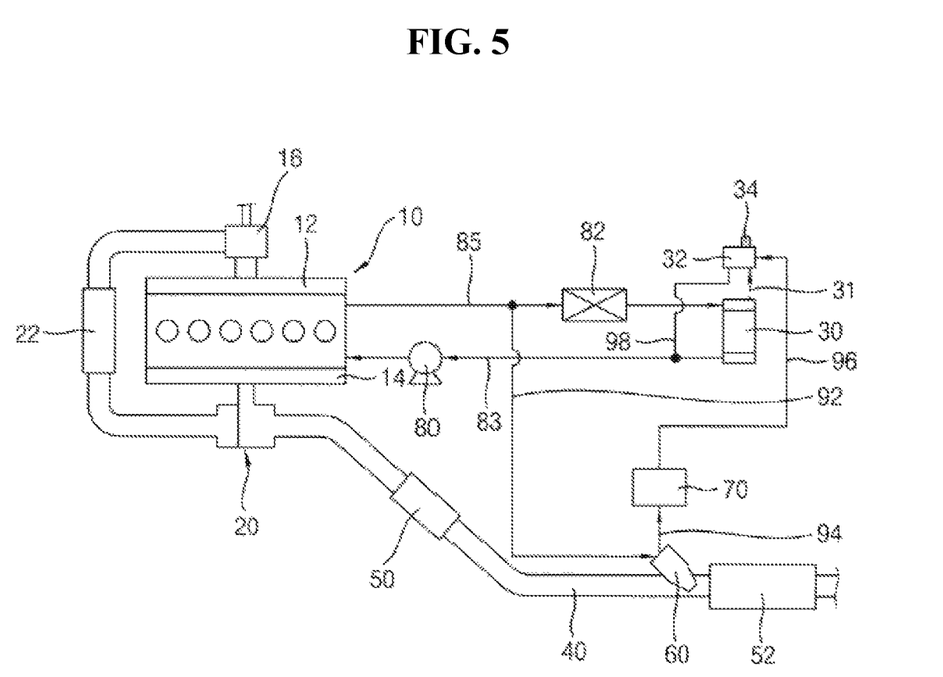
FIG. 5 is a view illustrating an engine cooling system in accordance with example embodiments.

FIG. 5 is a view illustrating an engine cooling system in accordance with example embodiments. The engine cooling system may be substantially the same as or similar to the selective catalytic reduction system as described with reference to FIG. 1, except for a connection relationship between a coolant recovery portion and a vapor storage portion. Thus, same reference numerals will be used to refer to the same or like elements and any further repetitive explanation concerning the above elements will be omitted.

Referring to FIG. 5, an engine cooling system may include an engine coolant circulation line for circulating a coolant for cooling an engine 10, a coolant pump 80 installed in the engine coolant circulation line to forcibly circulate the coolant, and a radiator 30 installed in the engine coolant circulation line to cool the coolant.

The engine coolant circulation line may include an engine coolant supply line 83 for supplying the coolant to the coolant pump 80 and an engine coolant recovery line 85 for recovering the coolant discharged from the coolant pump 80 again to the coolant pump 80. The radiator 30 may be installed between the engine coolant supply line 83 and the engine coolant recovery line 85.

A coolant supply line 92 connected to a module cooling channel of a reducing agent injection module 60 may be connected to the engine coolant recovery line 85, and a coolant recovery line 94, 96, 98 connected to the module cooling channel of the reducing agent injection module 60 may be connected to the engine coolant supply line 83.

In example embodiments, the coolant recovery line may include a first coolant recovery line 94, a second coolant recovery line 96 and a third coolant recovery line 98. In particular, the first coolant recovery line 94 may connect the module cooling channel and a coolant recovery portion 70. The second coolant recovery line 96 may connect the coolant recovery portion 70 and a vapor storage portion 32. The third coolant recovery line 98 may connect the vapor storage portion 32 to the engine coolant supply line 83. Accordingly, the second and the third coolant recovery lines 96, 98 may connect the coolant recovery portion 70 and the engine coolant supply line 83.

The coolant supply line 92 may branch off from the engine coolant recovery line 85, and the third coolant recovery line 98 of the coolant recovery line may branch off from the engine coolant supply line 83. Accordingly, discharge efficiency may be improved due to an operation of the coolant pump 80. The coolant supply line 92 may be connected to the engine coolant recovery line 85 upstream of a thermostat 82 and the radiator 30, to provide a coolant control of the engine cooling system in consideration of the cooling efficiency of the reducing agent injection module 60.

The connection relationship between the engine coolant circulation line and the coolant circulation line 90 may not be limited thereto. The coolant supply line 92 may be connected to the engine coolant supply line 83 downstream of the coolant pump 80, and the coolant recovery line 94, 96, 98 may be connected to the engine coolant recovery line 85 upstream of the thermostat 82. In here, 'upstream of an element' represents a location prior to the element along a flow of the coolant, and 'downstream of an element' represents a location past the element along the flow of the coolant.

The coolant discharged from the module cooling channel 62 may be exhausted through the coolant recovery portion 70 and the vapor storage portion 32 by the second and third coolant recovery lines 96, 98. That is, the vapor storage portion 32 may be used as a part of the coolant recovery line. In this case, when the engine operates, the coolant may be circulated through the vapor storage portion 32, and when the engine stops, the coolant in vapor state of the module cooling channel 62 may move sequentially through the coolant recovery portion 70 and the vapor storage portion 32 and then may be exhausted. The coolant recovery portion 70 and the vapor storage portion 32 may be installed higher than the module cooling channel 62 along a gravitational direction, and the second coolant recovery line 96 may be installed higher than the first coolant recovery line 96 along the gravitational direction.

Figure 6:
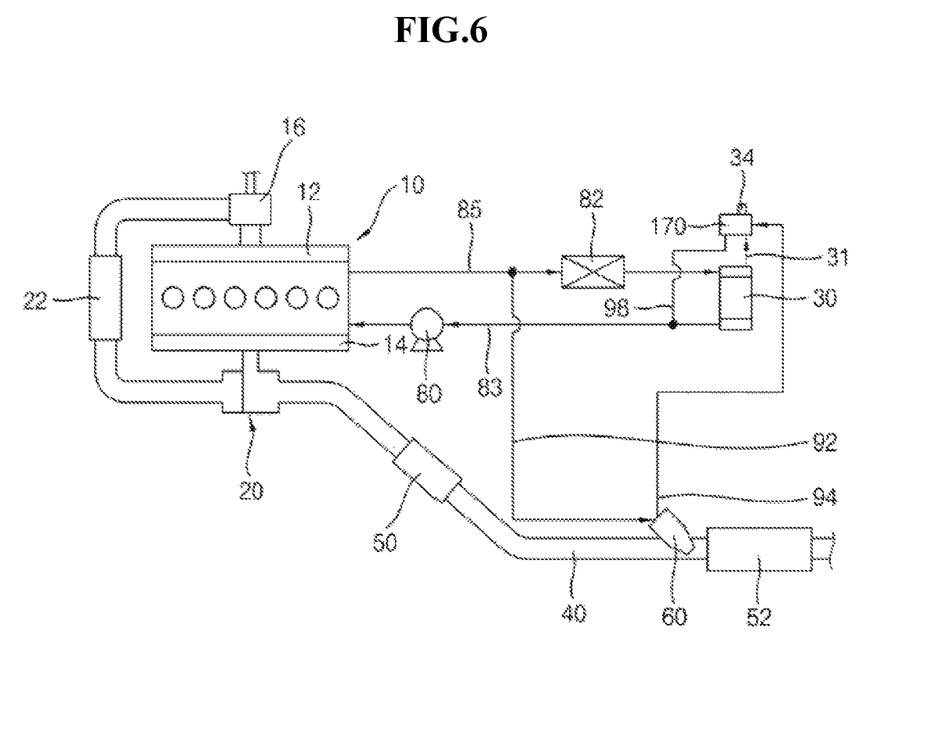
FIG. 6 is a view illustrating an engine cooling system in accordance with example embodiments.

FIG. 6 is a view illustrating an engine cooling system in accordance with example embodiments. The engine cooling system may be substantially the same as or similar to the selective catalytic reduction system as described with reference to FIG. 1, except that a vapor storage portion is connected to a radiator. Thus, same reference numerals will be used to refer to the same or like elements and any further repetitive explanation concerning the above elements will be omitted.

Referring to FIG. 6, a coolant recovery portion 170 having a function of the vapor storage portion 32 in FIG. 1 may be provided. According to this configuration, complexity and cost increase for both of the vapor storage portion and the coolant recovery portion may be prevented. A coolant in vapor state generated in a module cooling channel 62 may be exhausted to the outside through a first coolant recovery line 94 and a coolant recovery portion 170, and a coolant in liquid state in the coolant recovery portion 170 may be supplied to an engine coolant supply line 83 through a second coolant recovery line 98.

The present invention has been explained with reference to preferable embodiments, however, those skilled in the art may understand that the present invention may be modified or changed without being deviated from the concept and the scope of the present invention disclosed in the following claims.

<The description of the reference numerals>

| | |
|---|---|
| 10: engine | 12: intake manifold |
| 14: exhaust manifold | 16: mixer |
| 20: turbocharger | 30: radiator |
| 32: vapor storage portion | 34: vapor exhaust cap |
| 40: exhaust pipe | 50: diesel oxidation catalyst |
| 52: selective catalytic reduction device | 60: reducing agent injection module |
| 62: module cooling channel | 64: inlet portion |
| 66: outlet portion | 70, 170: coolant storage portion |
| 72: vapor discharge outlet | 80: coolant pump |
| 82: thermostat | 90: coolant circulation line |
| 92: coolant supply line | 94: first coolant recovery line |
| 96: second coolant recovery line | 100: vapor discharge line |
| L: coolant in liquid state | V: coolant in vapor state |
| F: circulation direction of coolant | |

The invention claimed is:

1. An engine cooling system, comprising:
 a selective catalytic reduction device installed in an exhaust pipe through which an exhaust gas from an engine is exhausted and configured to reduce a nitrogen oxide in the exhaust gas;
 a reducing agent injection module connected to the exhaust pipe to inject a reducing agent into the exhaust pipe upstream of the selective catalytic reduction device, the reducing agent injection module having a module cooling channel therein;
 a coolant circulation line including a coolant supply line for supplying a coolant to the module cooling channel and a coolant recovery line for recovering the coolant heated in the module cooling channel;
 a coolant recovery portion installed higher than the reducing agent injection module along a gravitational direction to store the coolant discharged through the coolant recovery line, the coolant recovery portion including a vapor discharge outlet for discharging a coolant in vapor state;
 an engine coolant circulation line configured to circulate the coolant for cooling the engine and including an engine coolant supply line and an engine coolant recovery line;
 a radiator configured to cool the coolant flowing through the engine coolant recovery line and to supply the coolant to the engine coolant supply line; and
 a vapor storage portion positioned over the radiator along the gravitational direction to store the coolant in vapor state discharged from the radiator,
 wherein the coolant supply line and the coolant recovery line are connected to the engine coolant circulation line such that at least a portion of the coolant circulating through the engine coolant circulation line is supplied to the module cooling channel, and
 wherein the vapor storage portion is connected to the vapor discharge outlet through a vapor discharge line to store the coolant in vapor state discharged from the engine coolant circulation line and the module cooling channel respectively.

2. The engine cooling system of claim 1, further comprising
 a coolant pump configured to forcibly circulate the coolant through the coolant circulation line,
 wherein the coolant recovery line comprises:
  a first coolant recovery line connecting the module cooling channel and the coolant recovery portion; and
  a second coolant recovery line connecting the coolant recovery portion and the coolant pump.

3. The engine cooling system of claim 2, wherein
 a coolant in liquid state and the coolant in vapor state in the module cooling channel move to the coolant recovery portion through the first coolant recovery line, and
 the coolant in liquid state in the coolant recovery portion moves to the coolant pump through the second coolant recovery line.

4. The engine cooling system of claim 1, wherein the vapor storage portion further includes a vapor exhaust cap, and wherein when a vapor pressure within the vapor storage portion is greater than a predetermined pressure, the coolant in vapor state is exhausted through the vapor exhaust cap to a surrounding environment.

5. The engine cooling system of claim 1, further comprising
 a coolant pump installed in the engine coolant circulation line to forcibly circulate the coolant,
 wherein the coolant supply line branches off from the engine coolant recovery line and the coolant recovery line branches off from the engine coolant supply line, and
 wherein a branch point of the engine coolant supply line and the coolant recovery line is positioned upstream of the coolant pump along the engine coolant supply line.

6. An engine cooling system comprising:
 a selective catalytic reduction device installed in an exhaust pipe through which an exhaust gas from an engine is exhausted and configured to reduce a nitrogen oxide in the exhaust gas;
 a reducing agent injection module connected to the exhaust pipe to inject a reducing agent into the exhaust pipe upstream of the selective catalytic reduction device, the reducing agent injection module having a module cooling channel therein;
 a coolant circulation line including a coolant supply line for supplying a coolant to the module cooling channel and a coolant recovery line for recovering the coolant heated in the module cooling channel;

a coolant recovery portion installed higher than the reducing agent injection module along a gravitational direction to store the coolant discharged through the coolant recovery line, the coolant recovery portion including a vapor discharge outlet for discharging a coolant in vapor state;

an engine coolant circulation line configured to circulate the coolant for cooling the engine and including an engine coolant supply line and an engine coolant recovery line; and a radiator configured to cool the coolant flowing through the engine coolant recovery line and to supply the coolant to the engine coolant supply line, wherein the coolant recovery portion is positioned over the radiator along the gravitational direction and the coolant recovery portion is connected with the radiator to store the coolant in vapor state discharged from the radiator and the coolant discharged from the module cooling channel, wherein the coolant supply line and the coolant recovery line are connected to the engine coolant circulation line such that at least a portion of the coolant circulating through the engine coolant circulation line is supplied to the module cooling channel, and wherein the coolant supply line is connected to the engine coolant circulation line and the coolant recovery line is connected to the engine coolant circulation line via the coolant recovery portion such that at least a portion of the coolant circulating through the engine circulation line is supplied to the module cooling channel.

7. The engine cooling system of claim 6, wherein the coolant recovery portion further includes a vapor exhaust cap connected to the vapor discharge outlet, and wherein when a vapor pressure in the vapor discharge outlet is greater than a predetermined pressure, the coolant in vapor state is exhausted through the vapor exhaust cap to a surrounding environment.

8. The engine cooling system of claim 6, further comprising a coolant pump installed in the engine coolant circulation line to forcibly circulate the coolant, wherein the coolant supply line branches off from the engine coolant recovery line and the coolant recovery line branches off from the engine coolant supply line, wherein the coolant supply line branches off from the engine coolant recovery line upstream of a thermostat which is installed in the engine coolant recovery line, and wherein the coolant recovery line is connected to the engine coolant supply line upstream of the coolant pump.

* * * * *